United States Patent [19]

Hansen et al.

[11] Patent Number: 4,574,890

[45] Date of Patent: Mar. 11, 1986

[54] TINE HOLDER FOR TURF AERATING APPARATUS

[75] Inventors: Loren F. Hansen; Mark E. Lamb, both of Lincoln, Nebr.

[73] Assignee: Outboard Marine Corporation, Waukegan, Ill.

[21] Appl. No.: 691,217

[22] Filed: Jan. 14, 1985

[51] Int. Cl.[4] .................. A01B 45/02; B60B 27/06
[52] U.S. Cl. .................................. 172/22; 172/751; 403/371
[58] Field of Search .................. 172/22, 763, 751, 21, 172/749; 403/371, 370, 374

[56] References Cited

U.S. PATENT DOCUMENTS

| | | | |
|---|---|---|---|
| 511,039 | 12/1893 | Bowen | 172/763 |
| 657,712 | 9/1900 | Thomas | 403/371 |
| 3,429,378 | 2/1969 | Mascaro | 172/22 |
| 4,134,700 | 1/1979 | Nelson | 403/371 |

Primary Examiner—Richard J. Johnson
Attorney, Agent, or Firm—John T. Synnestvedt; Richard D. Weber

[57] ABSTRACT

A tine holder for turf aerating equipment includes a horizontal tine arm having a plurality of spaced apertures therein having a diameter substantially equal to the inner diameter of the upper ends of the tines. The hollow tines are substantially cylindrical at their upper ends and abut the tine arm in alignment with the tine arm apertures. A tine holding bar disposed beneath the tine arm includes a plurality of tapered apertures aligned with the apertures in the tine arm. The tines pass through the tine holding bar apertures and are secured in position by split collets having frusto-conical exterior surfaces which seat within the tapered apertures of the tine holding bar. A plurality of bolts passing through aligned bolt holes in the tine arm and tine holding bar provide a tightening of the split collets to secure the tines in position against the tine arm.

12 Claims, 4 Drawing Figures

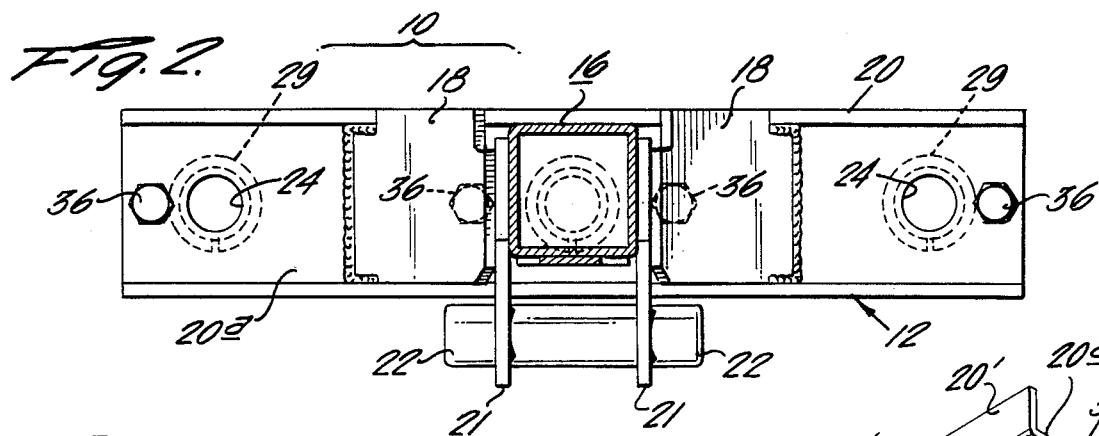
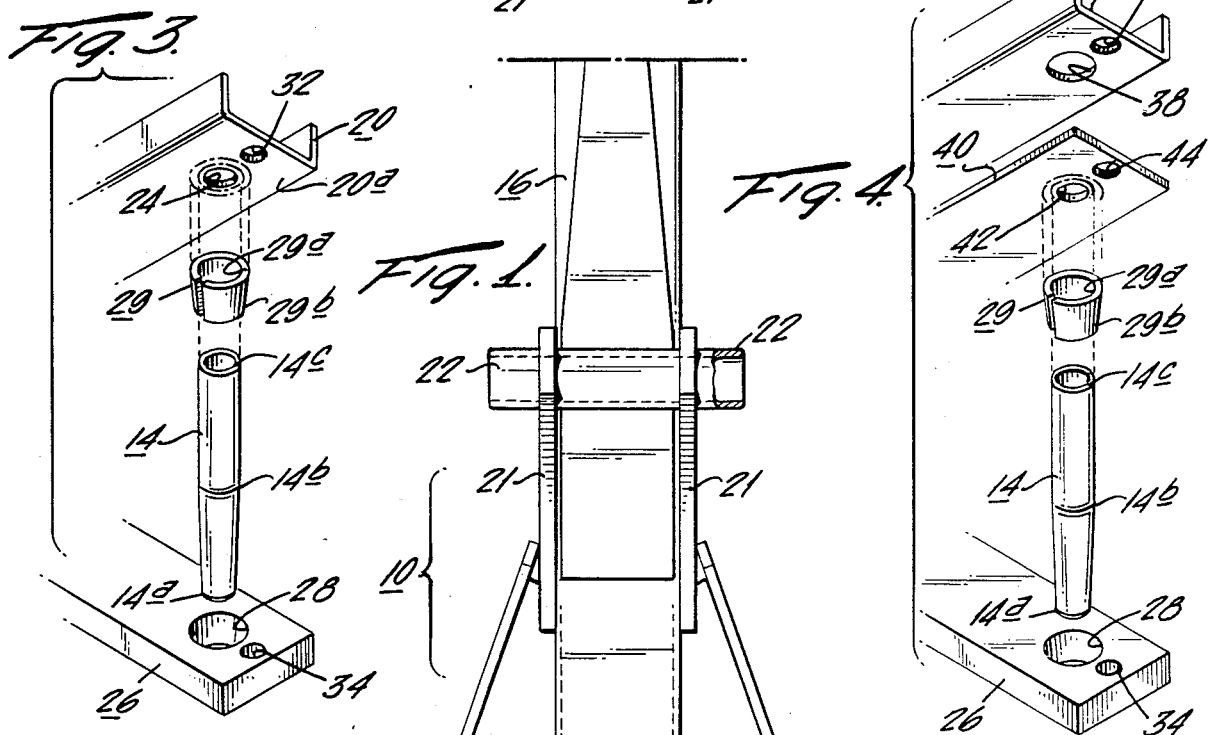
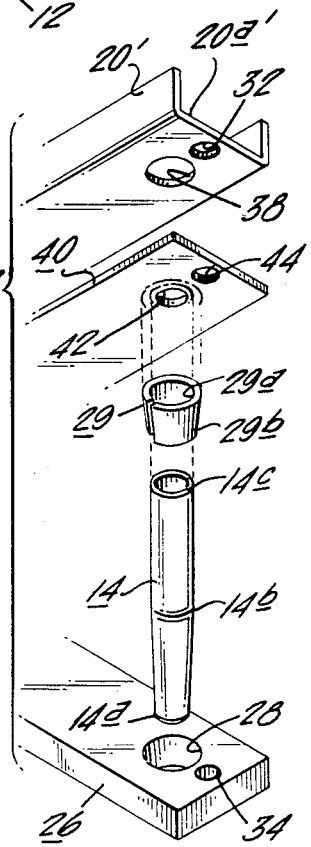
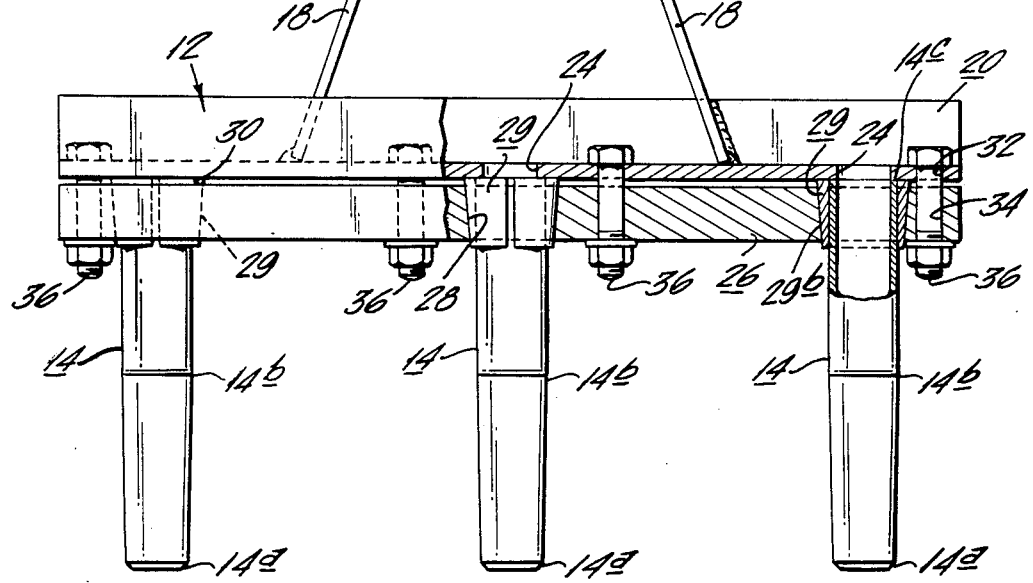

TINE HOLDER FOR TURF AERATING APPARATUS

BACKGROUND OF THE INVENTION

The present invention relates generally to turf aerating equipment and relates more particularly to an arrangement for securing hollow turf coring tines to a tine actuating member.

A variety of turf aerating devices have been developed for forming slots or holes in turf to permit the penetration of air, water and nutrients to the grass roots. The type of device which forms holes in the turf commonly utilizes a hollow coring tine as the turf penetrating element. Such tines usually are annular in section and slightly tapered, being larger at their upper ends, to facilitate the discharge of the turf cores therethrough. The mechanism for driving the tines into the ground conventionally provides a reciprocating motion to a group of tines and a given machine normally includes several groups of tines which are driven sequentially into the ground to provide a repeating turf aerating pattern.

Since the tines may strike stones or other impenetrable hard objects hidden within or beneath the turf, they are subject to breakage or deformation. The tines also wear out after an extended period of use. Their manner of attachment must accordingly permit tine replacement when necessary, and should further provide sufficient mounting security to prevent loss of the tines under severe service conditions.

Various arrangements have heretofore been employed for the attachment of turf aerating tines. In one conventional arrangement, the tine upper end is held within a split clamp on the tine carrying member. In another type of attachment, a split collet with external tapered threads is utilized to grip the upper end of the tine. Other tine securing arrangements have been proposed wherein the tines themselves are threaded and/or flanged, although their use has been limited because of their substantially increased cost.

Although conventional tine holding arrangements permit the ready replacement of a tine should it become damaged or unduly worn, they are subject to occasional tine loss due to the loosening of the tine attachment mechanism. Such tine loss not only deprives the aerator of its full aerating function, but by leaving metal tines partially protruding from the ground, presents a serious hazard to lawn mowing equipment and especially reel type mowers. It is accordingly important that a tine supporting arrangement be effective in preventing tine loss while still permitting the removal and replacement of individual tines without undue time and effort.

BRIEF SUMMARY OF THE INVENTION

In the present tine holding arrangement, a tine holding bar is provided with a plurality of spaced apertures at the desired tine locations. A plurality of hollow coring tines, each tine having a cylindrical upper end, are disposed beneath said tine arm in alignment with said tine arm apertures. The tine arm apertures have the same diameter as the inner diameter of the upper ends of the tines.

A split collet having a frusto-conical outer surface is disposed around the upper end of each tine, the collet being larger at its upper end than its lower end. A tine holding bar disposed beneath the tine arm includes a plurality of tapered apertures aligned with said tine arm apertures and sized to receive the split collets. The tine holding bar is secured to the tine arm by a plurality of bolts, the tightening of which compresses the collets and locks the tines securely in position against the tine arm in alignment with the tine arm apertures.

In a modified embodiment wherein the tine arm apertures are larger than the upper ends of the tines, an adaptor plate having spaced apertures aligned with said tine arm apertures is inserted beneath the tine arm to serve as an abutment surface for the upper ends of the tines and the split collets disposed thereon.

It is accordingly a first object of the present invention to provide a tine holder for turf aerating tines which secures the tines to the tine driving mechanism to effectively prevent tine loss.

Another object of the invention is to provide a tine holder as described which may be quickly and easily disassembled to permit removal and replacement of individual tines.

A further object of the invention is to provide a tine holder as described of an economical construction which is adapted for use with various types of tine driving mechanisms.

Additional objects and advantages of the invention will be more readily apparent from the following detailed description of an embodiment thereof when considered together with the accompanying drawings.

BRIEF DESCRIPTION OF THE DRAWINGS

FIG. 1 is a side elevational view of a turf aerating mechanism in accordance with the present invention with portions thereof broken away and in section;

FIG. 2 is a top plan view of the turf aerating mechanism shown in FIG. 1;

FIG. 3 is an exploded perspective view of a portion of the mechanism shown in FIGS. 1 and 2; and FIG. 4 is an exploded perspective view of a portion of a modified form of the mechanism shown in FIGS. 1 and 2.

DESCRIPTION OF THE PREFERRED EMBODIMENT

Referring to the drawings and particularly FIG. 1 thereof, a turf aerating mechanism generally designated 10 in accordance with the present invention includes a tine holder assembly 12 from which extends a plurality of spaced downwardly directed hollow coring tines 14. The tine holder assembly 12 is mounted beneath a substantially vertical tubular column 16 by a pair of diagonal brackets 18 which connect the lower end of the column to a horizontal tine arm 20 of the tine holder assembly. As most clearly shown in FIG. 3, the tine arm 20 comprises a channel shaped member having the free edges thereof directed upwardly. The upper end (not shown) of the vertical column 16 is connected to a reciprocating drive mechanism which imparts an essentially vertical driving motion to the column 16 to drive the tines 14 into the turf in a reciprocating fashion. Lugs 22 extending from plates 21 on each side of the column 16 permit connection of the tine holder assembly to a tine arm return mechanism (not shown) which returns the assembly to its starting position between ground engaging strokes.

The invention pertains to the manner of attachment of the coring tines 14 to the tine support means, and specifically, to the tine arm 20. The tines 14 comprise tubular members of annular transverse cross section, which are slightly tapered from their smaller lower free ends 14a to their larger midpoints 14b. From their midpoints 14b to their upper ends 14c, the tines are substantially cylindrical. The tapering of the lower ends of the tines facilitates passage of the turf cores therethrough.

A plurality of spaced circular apertures 24 in the downwardly facing portion 20a of the tine arm 20 are located at points corresponding to the desired positions of the tines 14. The diameter of the apertures 24 is substantially equal to the inner diameter of the upper ends of the tines.

A tine holding bar 26 disposed beneath and in spaced parallel relation to the tine arm 20 includes a plurality of spaced tapered apertures 28 aligned with the tine arm apertures 24. A split collet 29 is disposed in each said tine holding bar aperture. The inner surface 29a of each collet 29 comprises a cylindrical surface substantially the same diameter as the outer diameter of the cylindrical upper ends of the tines 14. The outer surface 29b of each collet comprises a frusto-conical surface having the same taper angle as the tine holding bar apertures 28, preferably an included angle of 10°.

With collets 29 seated within the apertures 28, and the tines 14 disposed within the collets as illustrated in FIG. 1, a small portion 30 of each collet extends above the tine holding bar 26 with the upper edge of both the collets and the tines engaging the lower surface of the tine arm. A plurality of aligned bolt holes 32 and 34 respectively in the tine arm and tine holding bar receive bolts 36, the tightening of which serves to bias the tine holding bar toward the tine arm, thereby compressing the split collets 29 and tightly clamping the tine upper ends therewithin in aligned relation to the tine arm apertures 24.

For use of the tine holder assembly, the tines with the split collets slipped over the upper ends thereof are inserted into the tapered apertures 28 of the tine holding bar and the bar is then attached to the tine arm by means of bolts 36. The bolts are preferably arranged so that at least one bolt is closely adjacent each tine. The tightening of the bolts will accordingly bias the tine holding bar 26 toward the tine arm, thereby compressing the split collet to tightly grip the upper end of the tines and secure them against the tine arm in alignment with the tine arm apertures. The sizing of the tine arm apertures to match the inner diameter of the upper end of the tines, and the alignment of the tines with the tine arm aperture insures an unobstructed passage of the turf cores upwardly through the tines and the tine arm apertures as the tines are reciprocated into the ground.

In the event that one or more of the tines requires replacement, the tine holding bar 26, along with the tines seated therein, is removed from the tine bar by removal of the bolts 36. The tine or tines requiring replacement may then be quickly removed and the substitute tine or tines put in their place. The tine holding bar, collets and tines are then reattached to the tine arm by means of the bolts 36.

Under certain circumstances, it may be necessary to employ an adaptor plate between the tine arm and the tine holding bar, collets and tines. Such a modification may be required, for example, when the tine arm apertures are larger than the upper ends of the tines such as when retrofitting the present tine holder arrangement to a tine arm made for a different system. Another instance in which such a modification may be necessary is when a change is to be made from a larger to a smaller size tine.

In FIG. 4, such a modified form of the invention is illustrated wherein the tine arm 20' includes apertures 38 in the downwardly facing portion 20a' thereof which are of a larger size than that of the previously described embodiment. To provide a bearing surface for the upper end of the tines, an adaptor plate 40 is provided disposed immediately beneath and in engagement with the downwardly facing surface of the tine arm and which includes apertures 42 aligned with the tine arm apertures but of a size substantially equal to the inner diameter of the upper end of the tines. Bolt holes 44 are provided to align with the bolt holes 32 of the tine arm and the bolt holes 34 of the tine holding bar. The remaining elements of the embodiment of FIG. 4 are identical to that described with respect to the embodiment of FIGS. 1-3 and the mode of assembly and function of the elements are essentially the same.

An important advantage of the invention is the simplicity of the tine construction which permits its economical manufacture. In fact, the invention may be utilized with conventional, commercially available tines having a cylindrical upper end configuration.

Manifestly, changes in details of construction can be effected by those skilled in the art without departing from the invention.

We claim:

1. A mounting arrangement for securing the cylindrical upper end of a hollow turf aerating tine to a tine supporting member, said mounting arrangement comprising an aperture in said tine supporting member, a tine holding bar disposed in spaced relation to said tine supporting member, a tapered aperture in said tine holding bar aligned with said tine supporting member aperture, a split collet having a tapered outer surface disposed in said tine holding bar tapered aperture, the upper end of said tine being disposed in said split collet, the larger end of said collet and the upper end of said tine extending beyond said tine holding bar into engagement with said tine supporting member, and demountable attachment means for biasing said tine holding bar toward said tine supporting member to compress said collet and thereby clamp the tine against said tine supporting member in alignment with the aperture therein.

2. The invention as claimed in claim 1 wherein said aperture in said tine supporting member comprises a round hole having a diameter substantially equal to the inner diameter of the cylindrical upper end of the tine.

3. The invention as claimed in claim 2 wherein said tine supporting member comprises a tine arm, and an adaptor plate disposed beneath said tine arm, said hole being located in said adaptor plate, the ends of said collet and tine engaging said adaptor plate.

4. The invention as claimed in claim 1 wherein said demountable attachment means comprises a plurality of bolts extending through aligned bolt holes in said tine supporting member and said tine holding bar.

5. An aerator tine holder assembly comprising a tine arm having spaced apertures therein, a tine holding bar disposed in spaced parallel relation to said tine arm, a plurality of tapered apertures in said tine holding bar aligned with the apertures of said tine arm, a tapered split collet disposed in each of said tine holding bar tapered apertures with the larger diameter end of said collet extending beyond said tine holding bar into engagement with said tine arm, a hollow coring tine disposed within each said collet with the tine end extending into engagement with the tine holding bar in alignment with an aperture of said tine holding bar, said tine arm apertures having substantially the same diameter as the inner diameter of said tine ends, and demountable attachment means for biasing said tine holding bar toward said tine arm to compress said collets and thereby clamp the tines therewithin.

6. The invention as claimed in claim 5 wherein said demountable attachment means comprises a plurality of bolts extending through aligned bolt holes in said tine arm and said tine holding bar.

7. The invention as claimed in claim 6 wherein at least one said bolt is located closely adjacent each said coring tine.

8. The invention as claimed in claim 5 wherein the portion of each said tine passing through said collet and the internal passage of said collet are substantially cylindrical and of substantially the same diameter.

9. The invention as claimed in claim 5 wherein each said tine is tapered adjacent its free end with the smallest diameter thereof occurring at the tine free end.

10. An aerator tine holder assembly comprising an elongated tine arm adapted for horizontal mounting on a turf aerator for vertical reciprocation thereby, a plurality of spaced circular apertures extending through a downwardly facing portion of said tine arm, a tine holding bar disposed in spaced parallel relation to said tine arm beneath said tine arm apertures, a plurality of tapered apertures in said tine holding bar aligned with the apertures of said tine arm, a plurality of split collets, each said collet having a frusto-conical outer surface configuration, each of said tapered tine holding bar apertures receiving one of said split collets in seated relation with the upper end of each said collet extending slightly above said tine holding bar and engaging said tine arm, a plurality of hollow coring tines, each said coring tine having a substantially cylindrical upper end portion, each said collet having a substantially cylindrical bore therein of substantially the same diameter as the cylindrical upper ends of said collets, each said collet having a tine disposed therein with the upper end of the tine engaging the tine arm in alignment with a tine arm aperture, said tine arm apertures having substantially the same diameter as the inner diameter of the cylindrical upper end of said tines, a plurality of aligned bolt holes extending through the tine arm and tine holding bar, and a plurality of bolts extending through said bolt holes, said bolt serving to bias said tine holding bar toward said tine arm to thereby compress said collets and clamp the upper ends of said tines therewithin in engagement with the lower surface of said tine arm and in alignment with said tine arm apertures whereby turf cores passing upwardly through said hollow coring tines may pass in an unobstructed fashion through said tine arm apertures.

11. The invention as claimed in claim 10 wherein at least one said bolt is located closely adjacent each said coring tine.

12. The invention as claimed in claim 10 wherein each said tine is tapered adjacent its free end with the smallest diameter thereof occurring at the tine free end.

* * * * *